United States Patent
Kang et al.

(10) Patent No.: US 6,950,934 B2
(45) Date of Patent: Sep. 27, 2005

(54) METHOD FOR MANAGING CERTIFICATE REVOCATION LIST BY DISTRIBUTING IT

(75) Inventors: Kyung-Hee Kang, Seoul (KR);
Sun-Jung Kim, Seoul (KR);
Seong-Hyoen Yang, Seoul (KR);
Young-Sook Lim, Seoul (KR)

(73) Assignee: Korea Telecom, Sungnam-shi (KR)

( * ) Notice: Subject to any disclaimer, the term of this patent is extended or adjusted under 35 U.S.C. 154(b) by 820 days.

(21) Appl. No.: 09/735,921

(22) Filed: Dec. 14, 2000

(65) Prior Publication Data
US 2002/0104000 A1 Aug. 1, 2002

(30) Foreign Application Priority Data
Oct. 12, 2000 (KR) ........................................ 2000-60053

(51) Int. Cl.⁷ ................................................ H04L 9/00
(52) U.S. Cl. ........................ 713/158; 713/156; 713/175
(58) Field of Search ................................ 713/158, 156, 713/155, 150, 175, 176, 177, 178, 179, 180–181; 380/229; 705/67

(56) References Cited

U.S. PATENT DOCUMENTS

| | | | | |
|---|---|---|---|---|
| 5,699,431 A | * | 12/1997 | Van Oorschot et al. | 380/30 |
| 5,717,758 A | * | 2/1998 | Micall | 713/158 |
| 5,774,552 A | * | 6/1998 | Grimmer | 713/156 |
| 5,960,083 A | * | 9/1999 | Micali | 713/175 |
| 6,128,740 A | * | 10/2000 | Curry et al. | 713/200 |
| 6,192,131 B1 | * | 2/2001 | Geer et al. | 380/283 |
| 6,226,743 B1 | * | 5/2001 | Naor et al. | 713/177 |
| 6,237,096 B1 | * | 5/2001 | Bisbee et al. | 713/178 |
| 6,314,517 B1 | * | 11/2001 | Moses et al. | 713/156 |
| 6,367,013 B1 | * | 4/2002 | Bisbee et al. | 713/178 |
| 6,487,658 B1 | * | 11/2002 | Micali | 713/158 |
| 2002/0188843 A1 | * | 12/2002 | Kocher | 713/156 |

* cited by examiner

Primary Examiner—Ayaz Sheikh
Assistant Examiner—Eleni Shiferaw
(74) Attorney, Agent, or Firm—Staas & Halsey LLP

(57) ABSTRACT

A method for distributively managing the CRL in a certifying system to certify the validity of a subscriber in an open communications network such as Internet, includes the steps of registering the certificate policy statement for the CRL by determining the distribution interval of the CRL; setting the structure of the certificate of the subscriber to issue the certificate according to the registered certificate policy statement; attesting the certificate by applying the distribution point mechanism according to the distribution interval to the CRL; and revoking the certificate by using the distribution points to revise the CRL displayed.

5 Claims, 9 Drawing Sheets

METHOD FOR MANAGING CERTIFICATE REVOCATION LIST BY DISTRIBUTING IT

FIELD OF THE INVENTION

The present invention relates to a method for managing certificate revocation list (CRL) by distributing it in a security service of the public key infrastructure (PKI) defined in ITU-T X.509 (ITU-Telecommunication Standardization Sector X.509), and a recording medium programmed by a computer for embodying the method.

PRIOR ART OF THE INVENTION

The PKI serves as a certifying framework consisting of a plurality of certifying agencies connected in hierarchy that provides the users with the security services using the public key password system necessary for confirming the validities of their information, certifying their identification, preventing them from denying the actions already performed, etc. in an open or distributed communication network such as Internet.

The PKI is also defined by the IBM Co. as a system of certifying agencies, registering agencies and storage establishments for providing services such as issuing, attesting, renewing, revoking and registering certificates, and managing password keys. In addition, the Canadian government defines the PKI as a system for transferring password keys and certificates enabling the traders to safely perform electronic commercial dealings or exchange important information. Therefore, the PKI may be considered as the integrated system of the hardware, software and policies for controlling the procedures of issuing and revoking the certificates for the security services such as attesting validities, certifying identifications, preventing denials of the actions already performed, etc., and the various keys such as password and public keys necessary for producing and confirming the electronic documents. Hence, there are required the international standardizations of the public key password system, PKI control and operation, certificate specifications and policies, and mutual certifications for the PKI to be effectively used for electronic commercial dealings, banking, security trading, insurance, etc. between different certifying agencies and between different countries.

Meanwhile, the ITU-T X.509 defines version 1 (V1), version 2 (V2), and version 3 (V3) for the certificate specifications issued by a certifying agency to a subscriber. The distribution point information structure of the CRL relating to the invention concerns the extension field of the certificate as defined in V3 (refer to FIG. 3A), and the extension field of the CRL as defined in V2 (refer to FIG. 3B).

Thus, the ITU-T X.509 provides the fundamental information necessary for applying the distribution points to the CRL, but does not clearly define how to specifically apply the distribution point mechanism to the CRL. An example of the CRL not employing the distribution point mechanism is described in reference to FIGS. 1 and 2 as follows.

FIG. 2 is a flow chart for illustrating the process of attesting the validity of a subscriber's certificate based on the CRL in the user's terminal environment as applied to FIG. 1, which shows no distribution point applied to the CRL. Referring to FIG. 2, the user's terminal receives in step 201 the subject name SUBJECT_NAME (hereinafter referred to as "s") of the subscriber to prepare in step 202 a phrase "LDAP_SEARCH" concerning the subscriber's certificate.

Then, when the user's terminal requests in step 203 the directory server 204 to send the subscriber's certificate according to the prepared phrase, the directory server 204 prepares a phrase "LDAP_SEARCH" concerning the CRL according to the "s" of the user in step 205. Requesting the directory server to send the CRL according to the prepared phrase in step 206, the directory server 204 sends the entire CLR file in step 207.

Checking the duration of the effective time based on the CRL file in step 208, the user's terminal retrieves in step 209 the serial number of the subscriber's certificate according to the phrase "LDAP_SEARCH" prepared in step 205. Finally, if the serial number is confirmed to be in the CRL in step 210, the user's certificate is invalidated in step 212, or otherwise validated in step 211.

In this context, when such conventional certifying system issues a certificate to a subscriber, it would be more effective that the subject which is one of the mandatory fields constituting the certificate be defined as the input data of the hash function so as to use its value as the reference distribution point of the CRL.

SUMMARY OF THE INVENTION

It is an object of the present invention to provide a method for managing the CRL by applying the distribution point mechanism thereto, and a recording medium programmed by a computer for embodying the method.

It is another object of the present invention to provide the user of the security services with means for effectively searching the CRL containing the valid information of the subscribers' certificates from the directory server.

It is still another object of the present invention to reduce the time taken for performing the security services by minimizing the size of the CRL file downloaded from the directory server to the user's terminal.

It is further another object of the present invention to prevent concentration of the accesses to a certain CRL node by distributing the CRL information among a number N of CRL nodes in balance.

According to an aspect of the present invention, a method for distributively managing the CRL in a certifying system to certify the validity of a subscriber in an open communications network such as Internet, comprises the steps of registering the certificate policy statement for the CRL by determining the distribution interval of the CRL, setting the structure of the certificate of the subscriber to issue the certificate according to the registered certificate policy statement, attesting the certificate by applying the distribution point mechanism according to the distribution interval to the CRL, and revoking the certificate by using the distribution points to revise the CRL displayed.

According to another aspect of the present invention, there is provided a recording medium programmed by a computer for performing a method for distributively managing the CRL in a certifying system to certify the validity of a subscriber in an open communications network such as Internet, which comprises the steps of registering the certificate policy statement for the CRL by determining the distribution interval of the CRL, setting the structure of the certificate of the subscriber to issue the certificate according to the registered certificate policy statement, attesting the certificate by applying the distribution point mechanism according to the distribution interval to the CRL, and revoking the certificate by using the distribution points to revise the CRL displayed.

Thus, the invention provides the user of the security services with means for effectively searching the CRL containing the valid information of the subscribers' certificates from the directory server, reduces the time taken for performing the security services by minimizing the size of the CRL file downloaded from the directory server to the user's terminal, and prevents concentration of the accesses to a certain CRL node by distributing the CRL information among a number N of CRL nodes in balance.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Figure 4:
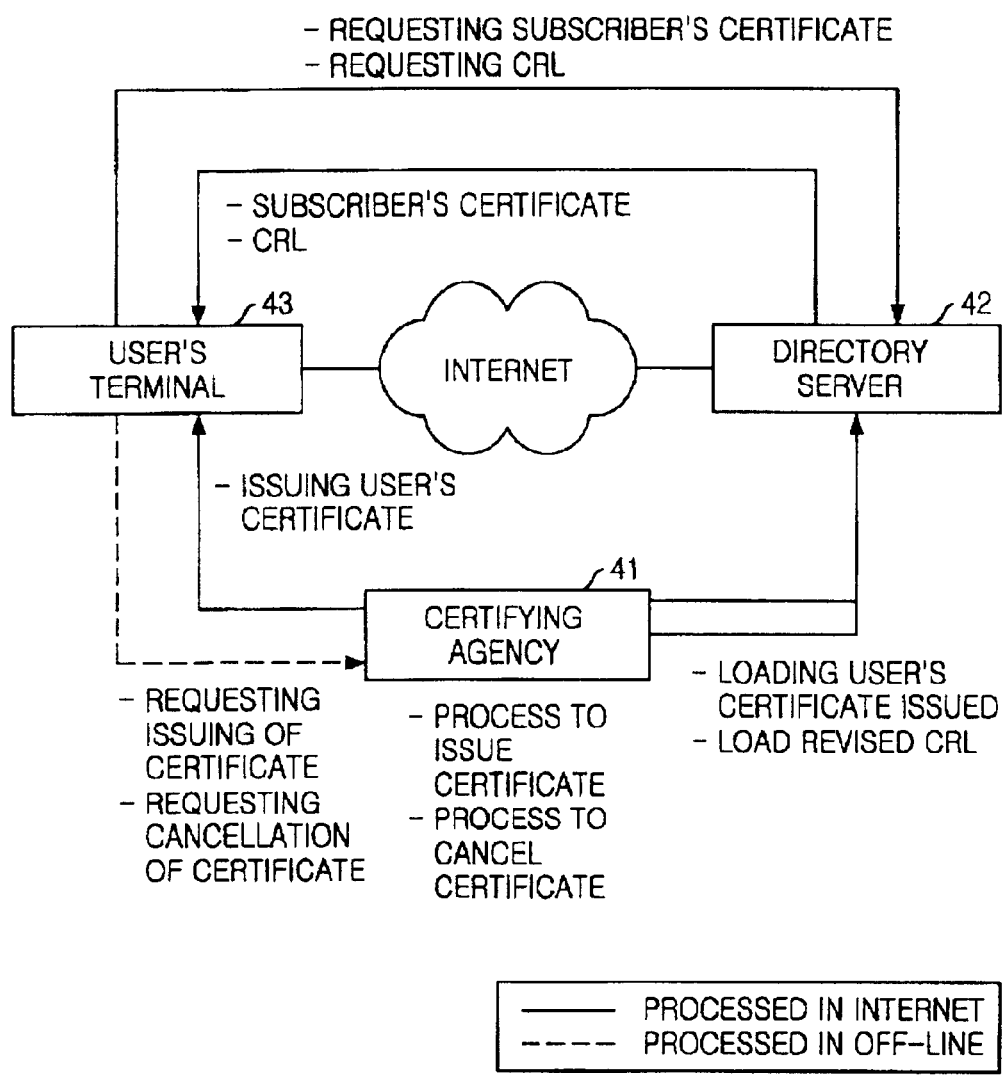
FIG. 4 is a schematic diagram for illustrating the structure of a PKI security service system where the invention is applied.

Referring to FIG. 4, the PKI security service system comprises a certifying agency or system (CA) 41 for issuing, revoking, and reissuing a certificate to a subscriber, a directory server 42 for managing the files corresponding to the subscribers' certificates and CRL received from CA 41, and a user's terminal 43 for requesting CA 41 to issue/revoke the certificate and for accessing the directory server 42 to download the certificate of a subscriber and CRL to perform the security services.

Figure 5:
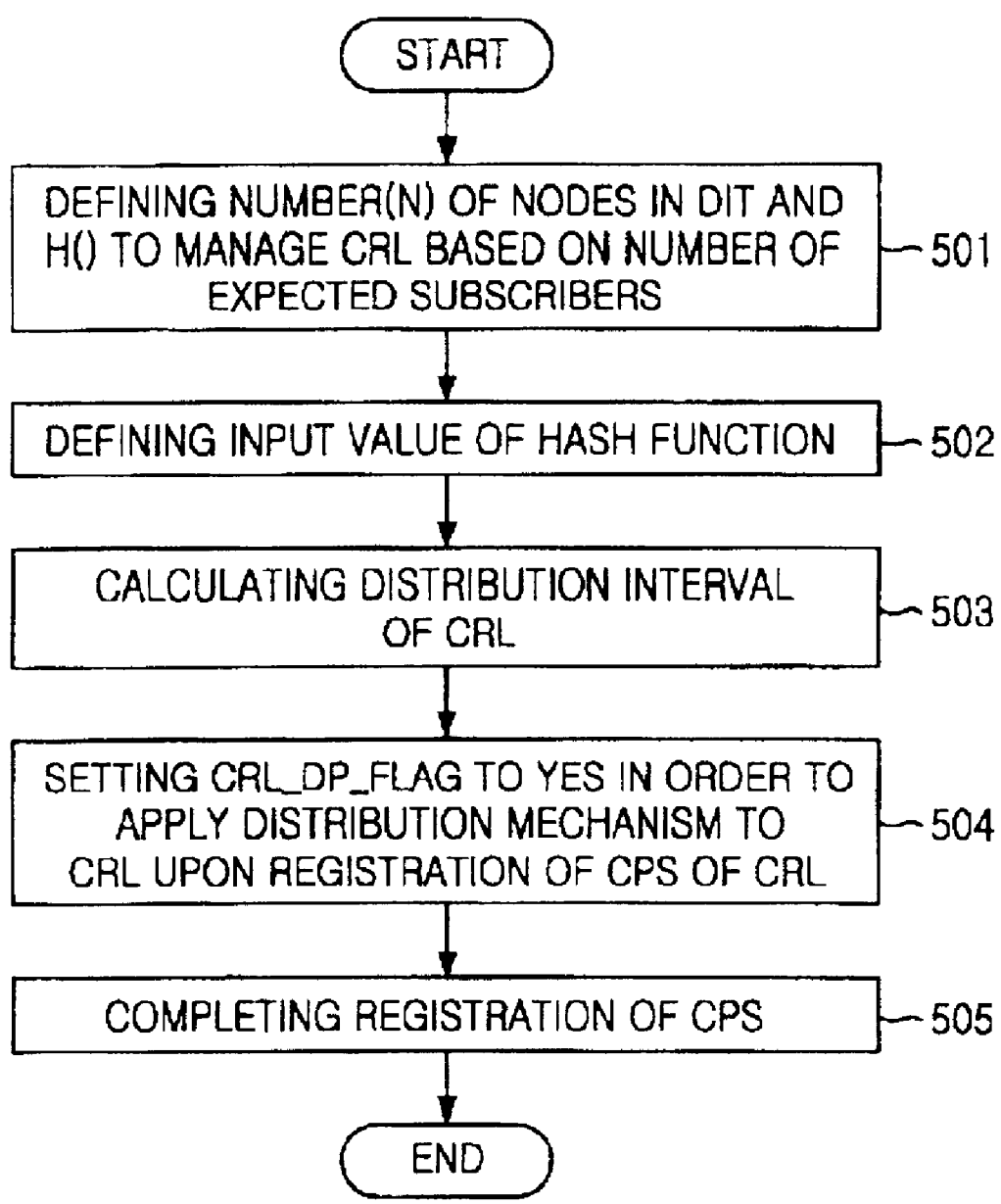
FIG. 5 is a flow chart for illustrating the procedure of registering the certificate policy statement in the inventive method of distributively managing the CRL.

Describing the procedure of registering the certificate policy statement (CPS) relating to CRL in connection with FIG. 5, the CA defines the number N of nodes in the directory information tree (DIT) and the hash function H( ) to manage the CRL based on the number of the expected subscribers in step 501. In this case, "N" represents the number of CRL files managed by CA, and H( ) the hash function used by CA.

Then, the subject name (SUBJECT_NAME, hereinafter referred to as "S") that is one of the essential items constituting the subscribers certificate is defined as the input value of the hash function in step 502. The function and the values of the variables defined in steps 501 and 502 are used to calculate the distribution interval in step 503 according to the following Equations 1 and 2:

$$H(S) = V \qquad \text{Equation 1}$$

$$\frac{V_{max} - V_{min}}{N} = I \qquad \text{Equation 2}$$

In Equations 1 and 2, assuming that "V" πrepresents the value obtained by inputting "S" to H( ) in Equation 1, the difference between the maximum value $V_{max}$ and the minimum value $V_{min}$ is divided by "N" to produce the distribution interval "I" of CRL. Then, when registering CPS of CRL, the corresponding variable crl_dp_flag is set to yes in step 504 in order to apply the distribution point mechanism to CRL before completing the registration of OPS in step 505.

Figure 6:
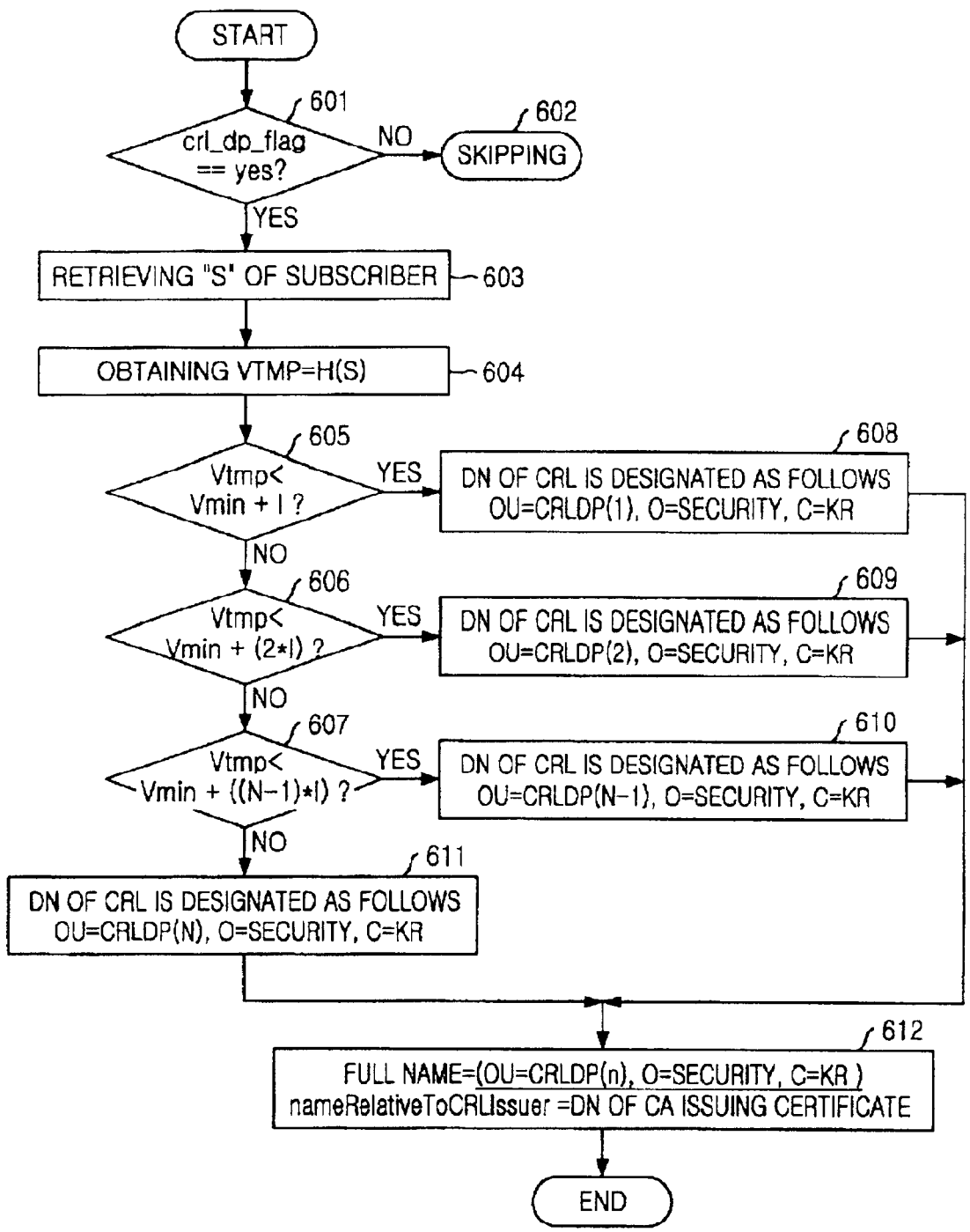
FIG. 6 is a flow chart for illustrating the procedure of issuing the certificate by the certifying system according to the inventive method of distributively managing the CRL.

Referring to FIG. 6, when CA issues a certificate to a subscriber, it firstly determines in step 601 whether the CPS corresponding to the subscriber sets the distribution point to be applied to the CRL (crl_dp_flag=yes) or not. If so, the subject name SUBJECT_NAME, i.e., "S" of the subscriber is retrieved as the input value of the hash function in step 603, or otherwise skipping to step 602. Then, the value of the hash function is obtained as Vtmp in step 604 (Vtmp=H(s)).

Through the steps 605 to 607 is obtained the interval value including Vtmp. In this case, the distinguished name DN of CRL is structured through the steps 608 to 611 so that OU (Organization Unit)=CRLDP(n), O (Organization)=SECURITY, and C (Country)=kr. Namely, the steps of 605 to 607 are to determine the value of "n" that is the interval value of CRL to complete DN of CRL through the steps of 608 to 611 when CRL is revoked.

Figure 1:
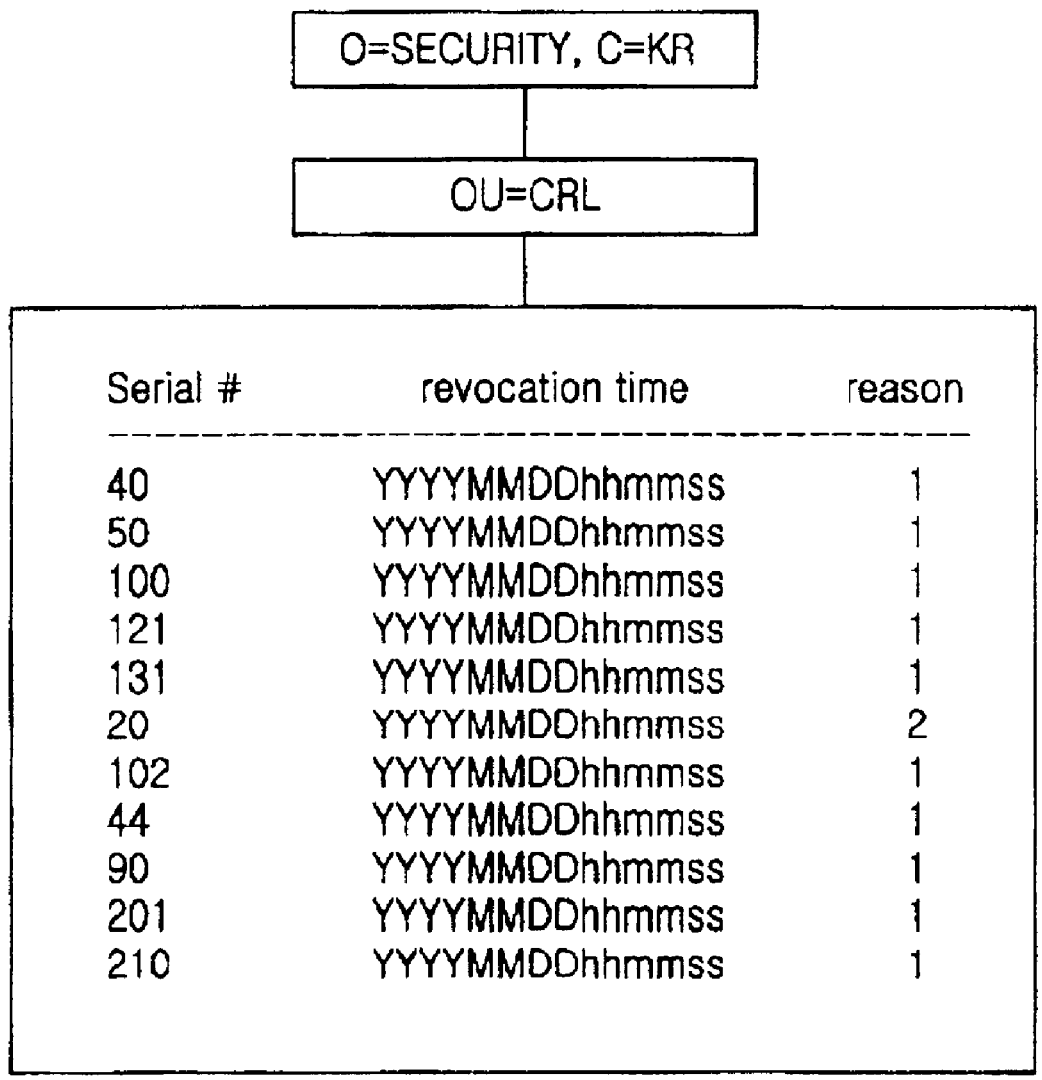
FIG. 1 is a diagram for illustrating the structure of managing the CRL by a conventional directory server.
Figure 2:
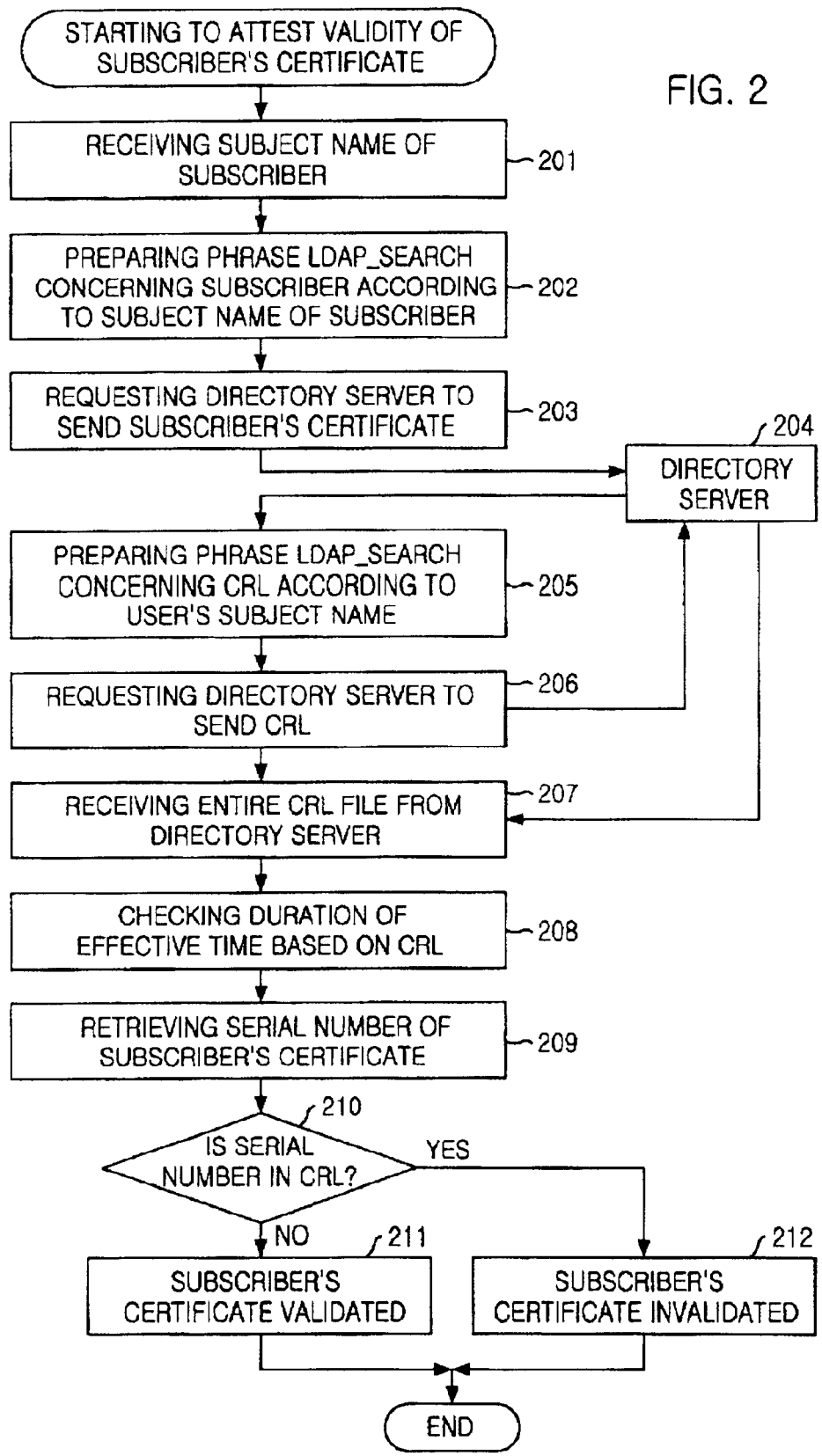
FIG. 2 is a flow chart for illustrating the process of validating the subscriber's certificate by means of the CRL in the user's terminal environment as shown in FIG. 1.
Figure 3A:
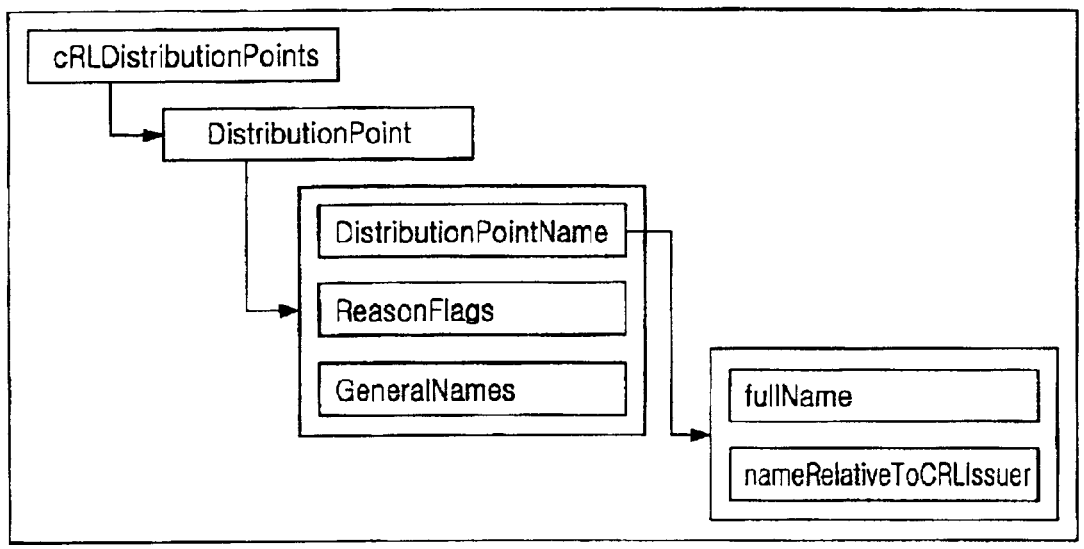
FIGS. 3A and 3B illustrate the data structures defined for the CRL provided with the distribution points in the ITU-T X.509.
Figure 3B:
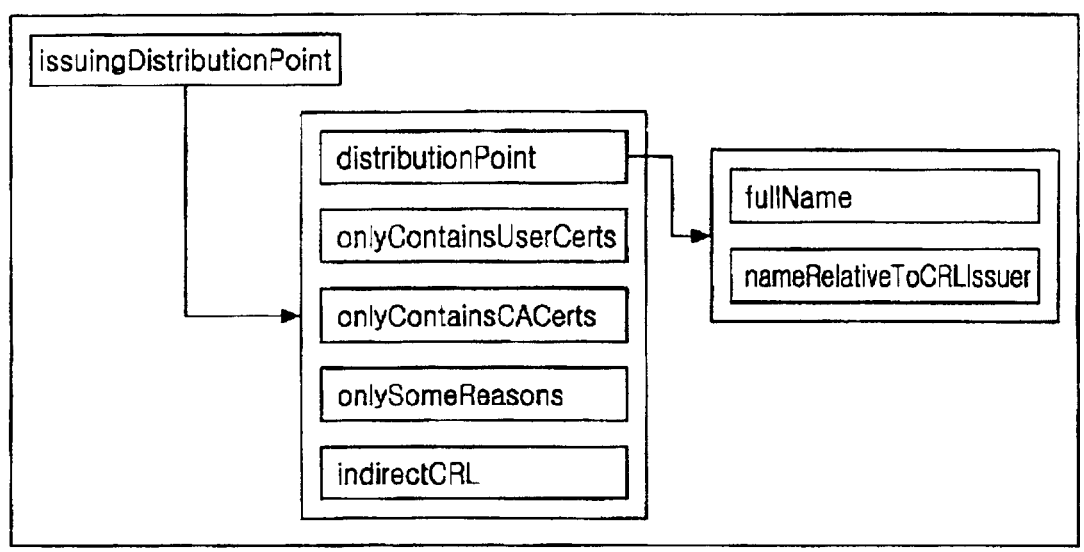

The DN of the CRL determined through the steps of 608 to 611 and the DN of the CA issuing the CRL are respectively put into the full name fullName and the name of the CA nameRelativeToCRLIssuer constituting the structure of the distribution point name DistributionPointName to complete the information of the CRL of the subscriber obtained by applying the distribution point to the certificate structure of the subscriber in step 612, as shown in FIG. 3A.

Figure 7:
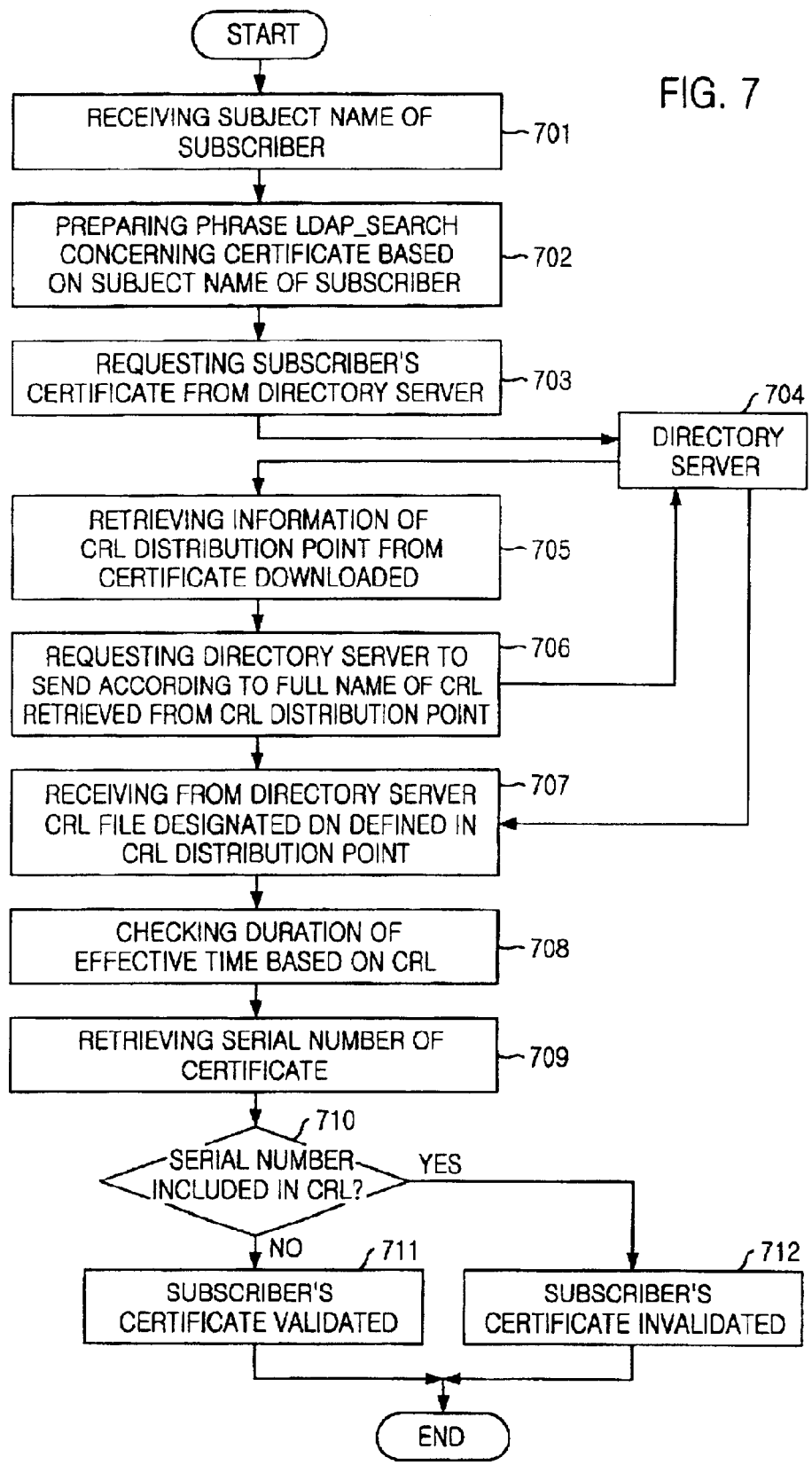
FIG. 7 is a flow chart for illustrating the procedure of validating the subscriber's certificate in the inventive method of distributively managing the CRL.

Describing the procedure of validating the certificate of the subscriber in connection with FIG. 7, the user's terminal firstly prepares a phrase LDAP_SEARCH concerning the subscriber's certificate in step 702 based on the subject name SUBJECT_NAME received from the subscriber or application program in step 701. If the user's terminal requests the subscriber's certificate from the directory server 704 in step 703 according to the prepared phrase, the directory server 704 sends the subscriber's certificate to the user's terminal according to "S". Then, the user's terminal retrieves the information of the CRL distribution point crlDistributionPoint, as shown in FIG. 3A.

Requesting the CRL from the directory server 704 according to the full name retrieved from the information of the CRL distribution point in step 706, the directory server 704 sends the CRL file designated the corresponding DN defined in the CRL distribution point in step 707. Then, checking the duration of the effective time based on the CRL file in step 708, the user's terminal retrieves in step 709 the serial number of the subscriber's certificate according to the information of the CRL distribution point crlDistributionPoint obtained in step 705. Then, the subscriber's certificate is invalidated in step 712 or validated in step 711 according as the serial number is included in the CRL or not.

Figure 8:
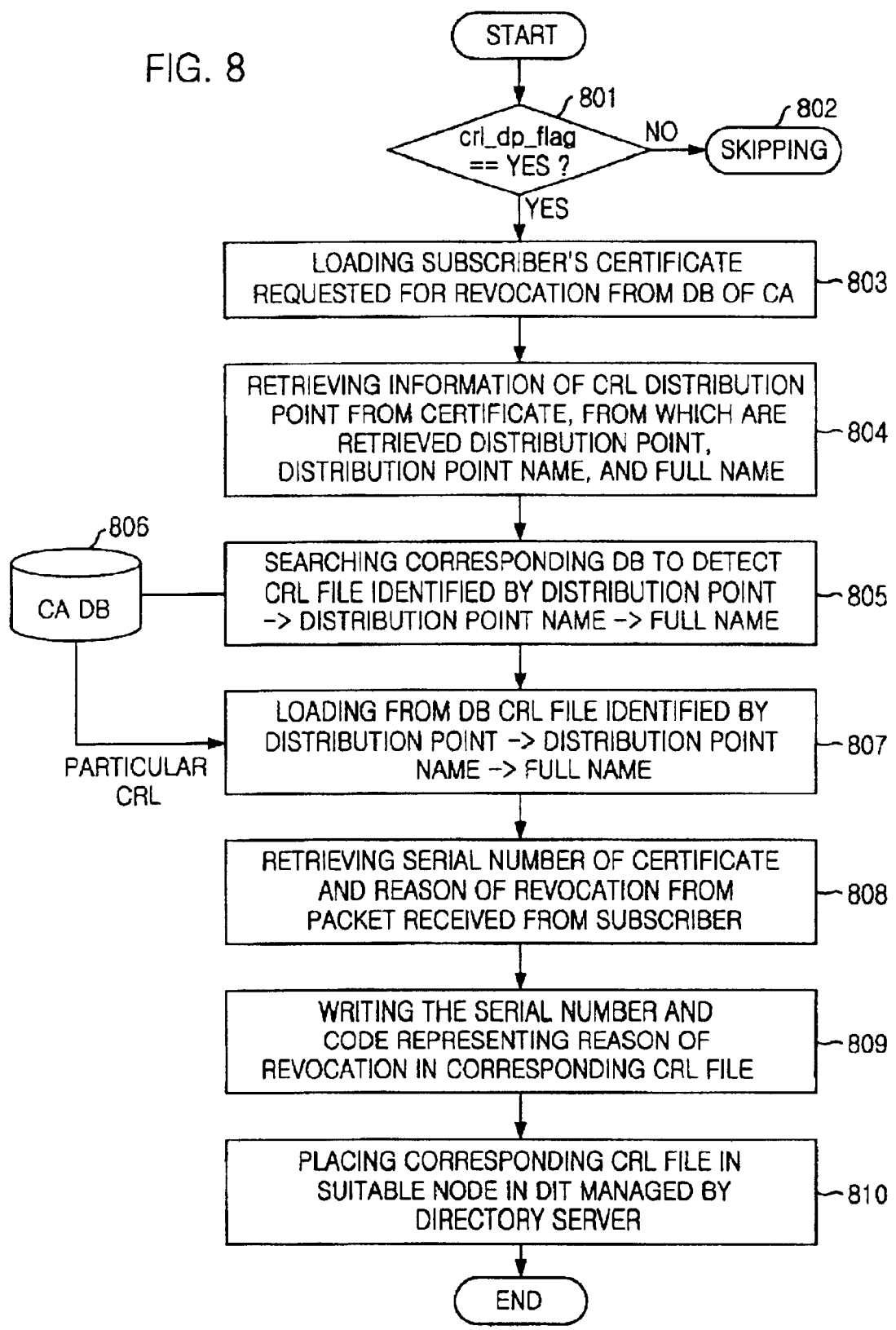
FIG. 8 is a flow chart for illustrating the procedure of revoking the subscriber's certificate in the inventive method of distributively managing the CRL.

Describing the procedure of revoking the subscriber's certificate in connection with FIG. 8, the CA determines in step 801 that the CPS applied to the subscriber sets the distribution point to be applied to the CRL (crl_dp_flag= yes). If so, the CA loads from the database DB the certificate of the subscriber requesting revocation in step 803, or otherwise skipping to step 802.

Figure 9:
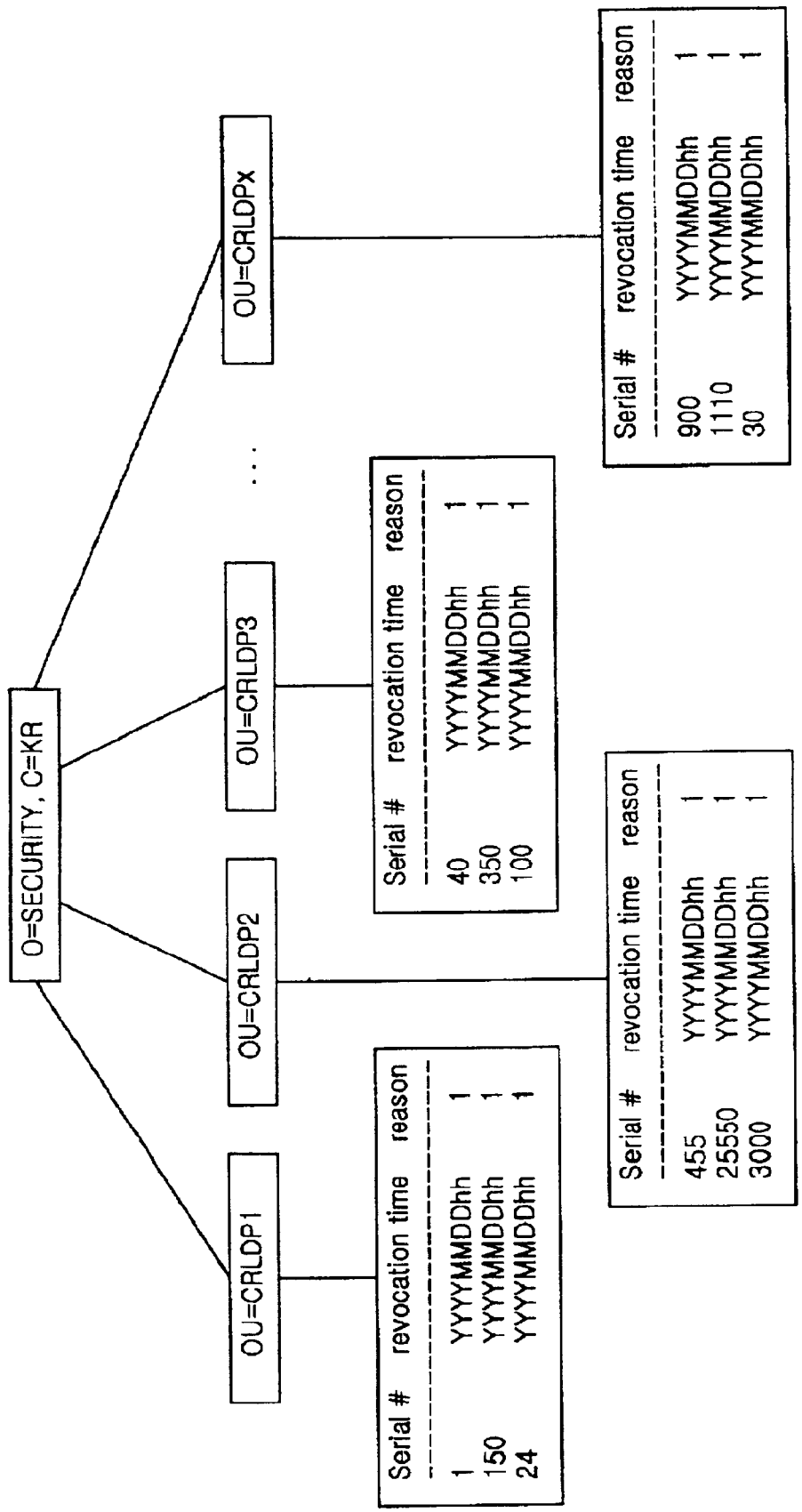
FIG. 9 is a diagram for illustrating the structure of managing the CRL by the directory server according to the inventive method of distributively managing the CRL.

From the loaded certificate is retrieved the information of the CRL distribution point crlDistributionPoint, from which are sequentially retrieved distribution point DistributionPoint, distribution point name DistributionPointName, and full name fullName in step 804. Then, the CRL file identified by crlDistributionPoint, DistributionPointName, and fullName is loaded from the corresponding database 806 through steps 805 and 807. Then, the CA retrieves the serial number of the subscriber's certificate and the reason of revocation from the packet received from the subscriber in step 808 to write the serial number and the code representing the reason of revocation into the corresponding CRL in step 809. Finally, the corresponding CRL file is placed in a suitable node in DIT manage by the directory server. Thus, applying the inventive distribution point mechanism, the CRL is distributed in balance among N nodes in the directory server as shown in FIG. 9.

Summarizing the effects of the invention, firstly the time taken for the user of security services to validate the subscriber's certificate is considerably reduced because of the small-sized CRL. Secondly the CRL is distributed in balance among a plurality of nodes in the directory server so that the accesses are not concentrated to a particular CRL node. Thirdly the distribution of the CRL by means of the distribution point mechanism enables the CA to effectively manage a plurality of CRL files uniformly sized and to deal with the users' names in a variety of formats.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for distributively managing the certificate revocation list (CRL) in a certifying system to certify the validity of a subscriber in an open communications network such as Internet, comprising the steps of:

a) registering the certificate policy statement for the CRL by determining the distribution interval of the CRL;
   b) setting the structure of the certificate of the subscriber to issue the certificate according to the registered certificate policy statement;
   c) attesting the certificate by applying the distribution point mechanism according to the distribution interval to the CRL; and
   d) revoking the certificate by using the distribution points to revise the CRL displayed, wherein the step a) includes the steps of:
      a1) defining the number N of the nodes in the directory information tree (DIT) and the hash function H( ) to manage the CRL based on the number of the expected subscribers;
      a2) defining the subject name (SUBJECT_NAME) of the essential items constituting the certificate as the input value of the hash function;
      a3) calculating the distribution interval of the CRL by using following hash function H( ) and an equation $$\frac{V_{max} - V_{min}}{N} = I,$$

wherein V represents a value obtained by inputting the subject name (SUBJECT_NAME) to the hash function H( ), $V_{max}$ is a maximum value among a plurality of V, $V_{min}$ is a minimum value among a plurality of V, N is the number of the nodes and/is the distribution interval of the CRL; and a4) setting the value of the variable (crl_dp_flag) for the CRL according to the distribution interval.

2. A method as defined in claim 1, wherein the step b) includes the steps of:
   b1) retrieving the subject name (SUBJECT_NAME) of the subscriber as the input of the hash function or skipping according as the certificate policy statement sets the distribution point to be applied to the CRL (crl_dp_flag=yes) or not;
   b2) calculating the hash value (Vtmp) for the retrieved subject name;
   b3) obtaining the interval value (n) including the hash value to complete the distinguished name (DN) of the CRL upon revoking the corresponding certificate; and
   b4) issuing the certificate of the subscriber by setting the structure of the certificate by using the DN information of the CRL and the DN information of the certifying agency issuing the CRL.

3. A method as defined in claim 1, wherein the step c) includes the steps of:
   c1) preparing a phrase concerning the certificate of the subscriber according to the subject name (SUBJECT_NAME) of the subscriber;
   c2) requesting the certificate of the subscriber from the directory server by using the phrase to retrieve the information of the corresponding structure from the certificate downloaded according to the subject name (SUBJECT_NAME);
   c3) requesting the CRL designated the corresponding DN from the directory server according to the retrieved information;
   c4) retrieving the serial number of the subscriber by checking the duration of the effective time based on the CRL; and
   c5) invalidating or validating the subscriber's certificate according as the serial number is included in the CRL or not.

4. A method as defined in claim 3, wherein the step d) includes the steps of:
   d1) revising the subscriber's certificate requested for revocation in the database (DB) or skipping according as the certificate policy statement applied to the subscriber sets the distribution point to be applied to the CRL (crl_dp_flag=yes) or not;
   d2) revising the CRL retrieved according to the information of the structure of the revised subscriber's certificate through the corresponding database;
   d3) retrieving the reason of revoking the certificate from the packet received from the subscriber by detecting the serial number of the revised subscriber's certificate; and
   d4) writing the CRL revised to include the serial number of the subscriber's certificate and the code representing the reason of revocation into the node of the DIT managed by the directory server.

5. A computer readable recording medium storing instructions for performing a method for distributively managing the CRL in a certifying system to certify the validity of a subscriber in an open communications network such as Internet, the method comprising the steps of:

a) registering the certificate policy statement for the CRL by determining the distribution interval of the CRL;

b) setting the structure of the certificate of the subscriber to issue the certificate according to the registered certificate policy statement;

c) attesting the certificate by applying the distribution point mechanism according to the distribution interval to the CRL; and d) revoking the certificate by using the distribution points to revise the CRL displayed, wherein the step a) includes the steps of:

a1) defining the number N of the nodes in the directory information tree (DIT) and the hash function H( ) to manage the CRL based on the number of the expected subscribers;

a2) defining the subject name (SUBJECT_NAME) of the essential items constituting the certificate as the input value of the hash function;

a3) calculating the distribution interval of the CRL by using following hash function H( ) and an equation $$\frac{V_{max} - V_{min}}{N} = I,$$

wherein V represents a value obtained by inputting the subject name (SUBJECT_NAME) to the hash function H( ), $V_{max}$ is a maximum value among a plurality of V, $V_{min}$ is a minimum value among a plurality of V, N is the number of the nodes and/is the distribution interval of the CRL; and a4) selling the value of the variable (crl_dp_flag) for the CRL according to the distribution interval.

* * * * *